US011106690B1

(12) United States Patent
Dhillon et al.

(10) Patent No.: US 11,106,690 B1
(45) Date of Patent: Aug. 31, 2021

(54) NEURAL QUERY AUTO-CORRECTION AND COMPLETION

(71) Applicant: A9.com, Inc., Palo Alto, CA (US)

(72) Inventors: Inderjit Dhillon, Kensington, CA (US);
Vijai Mohan, Menlo Park, CA (US);
Po-Wei Wang, Pittsburgh, PA (US)

(73) Assignee: A9.COM, INC., Palo Alto, CA (US)

( * ) Notice: Subject to any disclaimer, the term of this patent is extended or adjusted under 35 U.S.C. 154(b) by 390 days.

(21) Appl. No.: 15/900,003

(22) Filed: Feb. 20, 2018

(51) Int. Cl.
*G06F 16/2458* (2019.01)
*G06N 7/00* (2006.01)
*G06N 3/08* (2006.01)
*G06F 16/242* (2019.01)

(52) U.S. Cl.
CPC ...... *G06F 16/2468* (2019.01); *G06F 16/2425* (2019.01); *G06N 3/08* (2013.01); *G06N 7/005* (2013.01)

(58) Field of Classification Search
CPC .......... G06F 16/90324; G06F 16/2468; G06F 16/2425; G06N 3/08; G06N 7/005
See application file for complete search history.

(56) References Cited

U.S. PATENT DOCUMENTS

| | | | | |
|---|---|---|---|---|
| 7,010,546 B1 * | 3/2006 | Kolawa | ............... | G06F 11/3688 707/694 |
| 9,384,266 B1 * | 7/2016 | Leicht | ................. | G06F 16/3322 |
| 2012/0166182 A1 * | 6/2012 | Ko | ........................ | G06F 40/274 704/9 |

OTHER PUBLICATIONS

Park, A Neural Language Model for Query Auto-Completion, pp. 1189-1192, August (Year: 2017).*
Duan, Online Spelling Correction for Query Completion, pp. 117-126, April (Year: 2011).*
Gao, A Large Scale Ranker-Based System for Search Query Spelling Correction, pp. 358-366 (Year: 2010).*
Chaudhuri, Extending Autocompletion to Tolerate Errors, pp. 707-718. (Year: 2009).*
Mitra Query Auto-Completion for Rare Prefixes, pp. 1-4 (Year: 2015).*

* cited by examiner

*Primary Examiner* — Albert M Phillips, III
(74) *Attorney, Agent, or Firm* — Hogan Lovells US LLP

(57) ABSTRACT

Various embodiments of systems and methods allow unsupervised, deep learning, character-level language models to complete and correct search engine queries, given arbitrary search prefixes. Embodiments use a multi-layer, character-level, recurrent neural network trained on query logs to generate query suggestions for the user. Integrated is an error correction framework. More particularly, approaches disclosed herein for query error correction and completion combine the character-level language models with an edit-distance-based potential function calibrated to generate spelling corrections, linking the two using a tree-based beam search algorithm that can exploit the potential functions and efficiently rank the suggestions. Optimizations are made to the predictive system, and efficient processor-based computations complete the queries, with error correction, in real-time. The embodiments substantially increase hit rate over standard approaches and are capable of handling tail queries.

17 Claims, 6 Drawing Sheets

NEURAL QUERY AUTO-CORRECTION AND COMPLETION

BACKGROUND

In the current "information age," with its explosion of content accessed online and in other data sets, the value of accurate search queries has never been higher. Systems allowing for search engine queries of content sometimes offer automatic query completion functionality, taking a prefix or other portion of a user-entered search query and generating multiple completion candidates. Such functionality essentially suggests terms and keywords as the queries are being typed, and search engine users have come to depend on query completion and correction to shape their various queries. Search completion offers enormous potential utility and value to users and search providers: the more accurately an engine can find a user's desired completions, the more quickly it can provide the user with his or her desired goal.

Critically, two elements are required to make any search completion of practical use for a search engine provider: (i) the completion must be error correcting, able to handle small errors in the user's initial input and provide completions for the most likely "correct" input; and (ii) the completion must operate in real-time, able to produce high-quality potential completions to the user in an amount of time that is not even perceivable to the user.

Currently, automatic completion of queries is a memory-based scheme and, intuitively, can be done through the use of a database or table lookup, called the "most popular completion" (MPC) method. That is, given a prefix, the approach fetches all known queries matching the prefix and returns the most frequent candidates. While fast in performance, the MPC scheme is not capable of understanding the query context and cannot generalize suggestions to something which is not in the database. Another major disadvantage of this approach that it is not possible to conceive and store all possible search term permutations—many prefixes simply may not exist in the database. So, much in the way of memory and storage capability is required, to at least attempt to save as many permutations as possible. Compounding the problem are the countless forms of user misspellings. For example, a user entering a search query may very well type something likg "ohon" (i.e., hitting one or more incorrect, adjacent keys on the keyboard) when attempting to enter the beginning of the word "phone" in the query.

In addition to database lookup approaches, in recent years some approaches use learning-based methods for query completion, such as a translation model at the word level to output single-word search query suggestions or use a neural network with a database-based model to handle tail queries (queries that run on real-time data, instead of on historical data) and output the single most likely word-level completion. These approaches, however, do not deliver character-level modeling, beam search ranking, real-time completion, or error correction.

Existing methods for error and spelling correction (as opposed to the concept of search completion) may be roughly divided into heuristic models and learning-based models, but those approaches are relatively "brute force," incapable of handling previously unseen character permutations, they train with simple language models, and they do not work in real-time.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to search engine query correction and completion.

In-progress or unfinished search engine queries can be completed if completion probabilities are known. Presently disclosed are systems and methods for completing queries from incomplete prefixes using a neural network and correcting errors (such as misspelling by a user) in the prefixes. The approaches disclosed herein for error correction combine a character-level language model with an edit-distance-based potential function, combining the two using a tree-based beam search algorithm.

Figure 1:
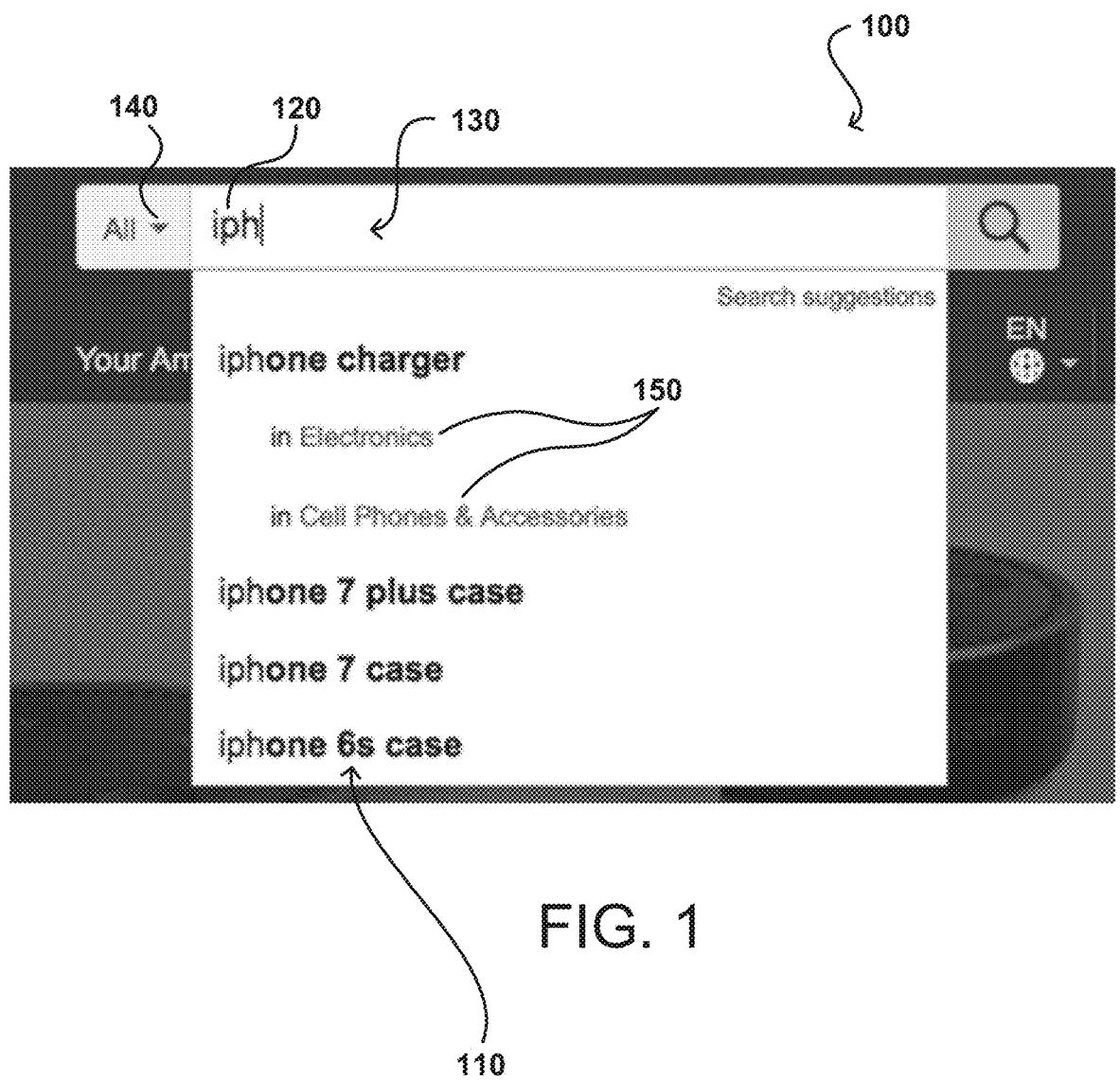
FIG. 1 illustrates a representative screen shot where, in accordance with various embodiments, query completion suggestions are offered in response to a partial search engine query.

As may be seen in the sample screen shot of FIG. 1, a representative embodiment of a deep, character-level learning system and method 100 for query auto-completion is executing, with such a neural system and method 100 able to automatically generate novel and synthetic query completion suggestions 110 as a user enters a prefix or beginning string or portion 120 of a search engine query 130. Instead of looking up possible completions from a generic database, applying the present systems and methods, searches are performed under the deep-network-based language model to find the most likely completions of a user's current input 120. This integrates the power of deep language models, shown to perform extremely well on complex language modeling and prediction tasks, with the desired goal of finding a good suggested completion 110. An advantage of this method is that, unlike lookup schemes, there is no need for significant storage capacity, as the various search permutations do not need to be stored. Additionally, to target certain completion suggestions 110 and search results in some embodiments, a dropdown or other input technique 140 permits a user to designate or select a specific category, subcategory, class, subclass, type, database, search index, alias, or the like. For example, in a backend operation to faciliate processing of a user-indicated category or class selection, when a query type input 140 is made, an unseen character is added to the beginning of the query prefix 120. Additionally, or alternatively, in a trained and algorithmic manner similar to completing partial queries, the neural system and method 100 can predict and suggest specific categories, classes, types, and the like 150 for the query completion suggestions 110.

Figure 2:
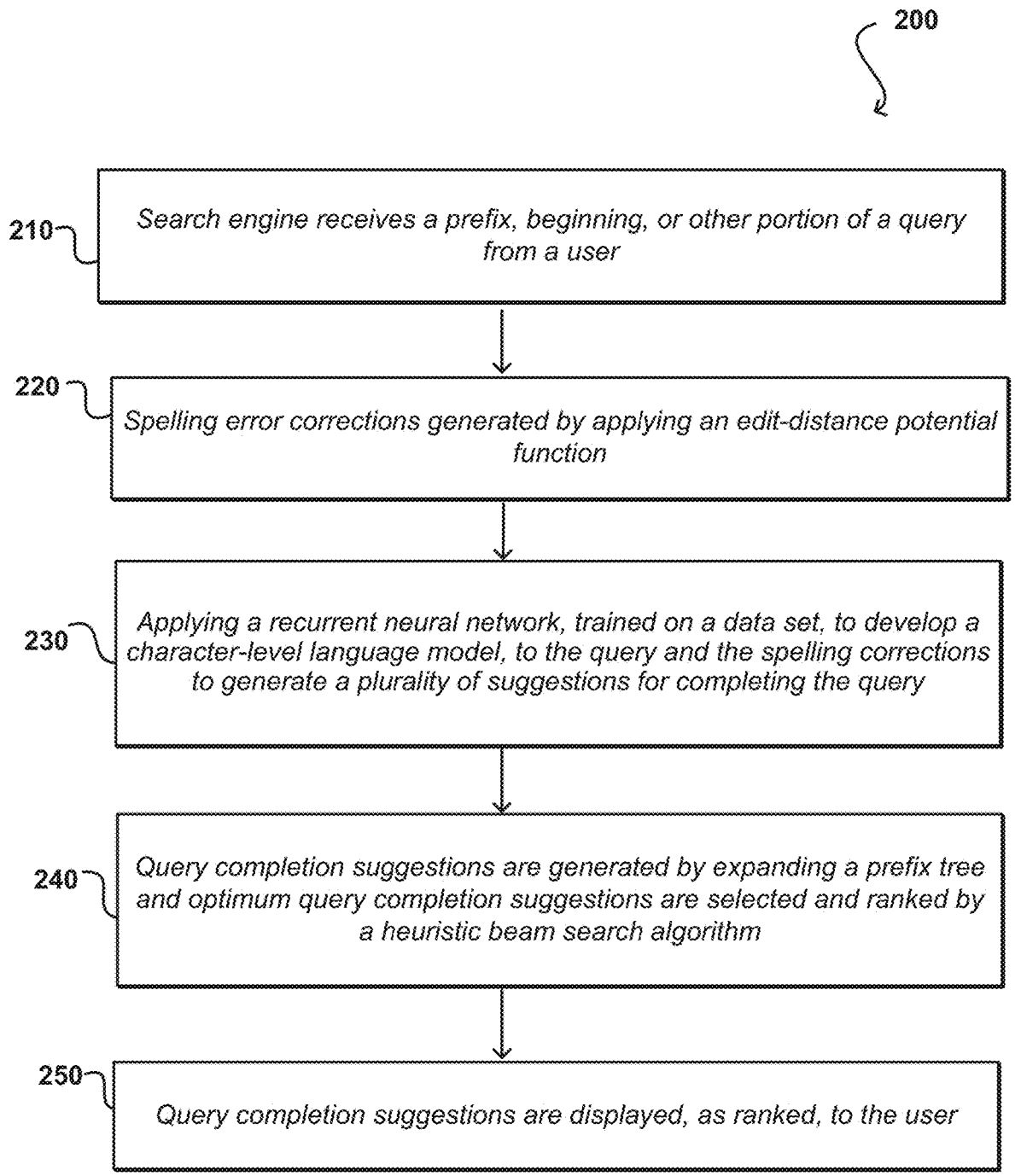
FIG. 2 is a block diagram illustrating the flow of a representative method for query correction and completion in accordance with various embodiments.

More particularly, as illustrated in FIG. 2, a representative process 200 for search query correction and completion begins with a search engine receiving 210 a prefix, beginning, or other portion 120 of a query entered by a user (or received as part of a maching-learning training phase prior to production use). Any necessary corrections for spelling errors in the query are generated 220 by applying an edit-distance potential function. A further step involves applying 230 a multi-layer, character-level, recurrent neural network, trained on a data set to develop a character-level language model, to the query and the spelling corrections to generate a plurality of suggestions 110 for completing the query. Those suggestions 110 are generated by expanding a prefix tree and selected and ranked 240 by a heuristic beam search algorithm. Finally, as the user continues to enter the query into the engine, the updated ranked suggestions 110 are displayed 250 to the user approximately in real-time, or at least apparently so to the user.

Figure 3:
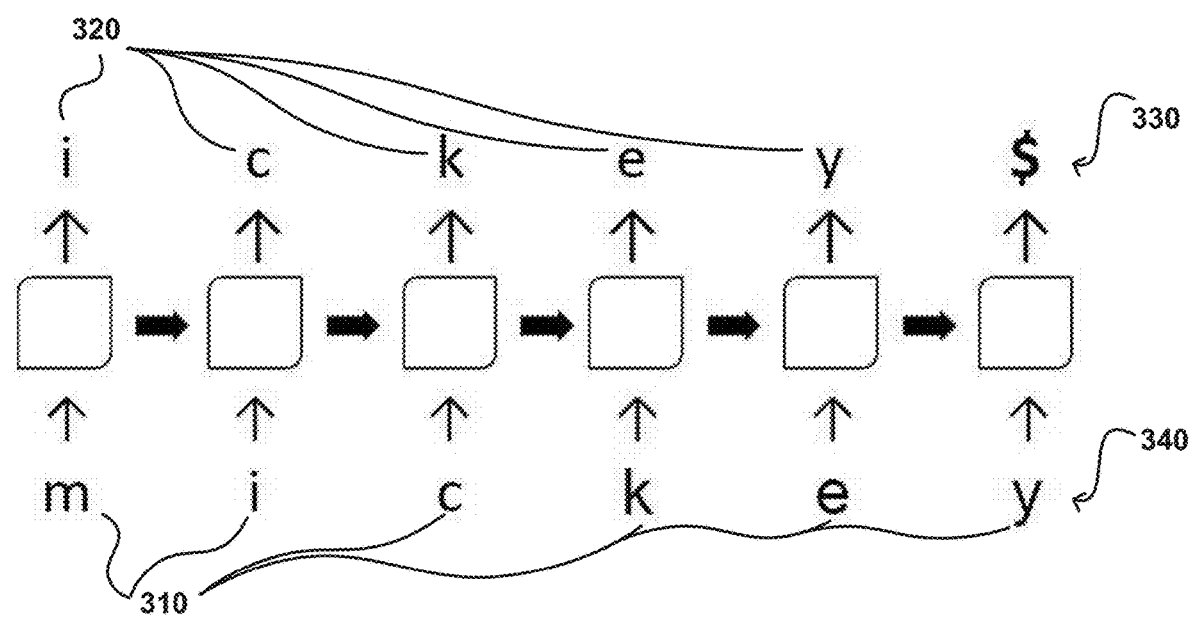
FIG. 3 illustrates a representative sequence to sequence input and output process for a training phase of a deep learning neural network in accordance with various embodiments.

Various embodiments implement deep learning technology for automatic completion of queries. Within deep learning, sequence to sequence modeling uses a variety of recurrent neural networks such as, but not limited to, long short-term memory (LSTM). Sequence to sequence modeling may be thought of as a sort of input and output architecture for the deep learning neural network used herein—a sequence of characters is input and a sequence is received in return. For example, to train the network using this model, prefixes can be obtained from known queries, one character at a time is fed into the system, as a search engine user would enter a query term or keyword, and the system is requested to fetch the known next character or word based on the entered prefix, with the process repeated to form a sequence. Many characters are input (potentially in the thousands or millions), and the neural network "learns" proper output for a given input when it comes time to predict and provide one or more completion suggestions 110 for a query prefix 120. If, say, the word to be taught is "cat," the letter "c" is fed into the system, then, based on known sequences, the system is requested to predict that the next letter is "a." At that point, an "a" is input, and the system is asked, given that a "c" and an "a" have been typed, to predict that the next letter is "t." In addition, the training provided by the present systems and methods can allow for a character, potentially unseen by querying users, to indicate the end of a word or sequence. FIG. 3 illustrates such an input 310 and output 320 sequence as characters forming the term "mickey" are entered for the machine-learning training, with the next-predicted character 330 shown above a respective character 340 entered by the system based on a query from a data set or the like.

LSTM is a component in the sequence to sequence topology in some illustrative embodiments, as an engine is to an automobile. An LSTM block or network is a simple recurrent neural network which can be used as a building component or block (of hidden layers) for an eventually bigger recurrent neural network. The LSTM block is itself a recurrent network because it contains recurrent connections similar to connections in a conventional recurrent neural network. In particular, various embodiments herein use a two-layer character level LSTM that is trained on the query logs from product search to generate query suggestions 110 for the user. The systems and methods use a beam search algorithm to efficiently rank the suggestions and are also able to correct spelling by using an edit distance potential function which is calibrated to generate spelling corrections. Finally, optimizations are made to the predictive system so that the predictions can be made in real time.

The illustrative models herein allow for efficient central processing unit (CPU)-based computation to perform automatic spelling correction and query completion in approximately real-time, with minimal latency (20 milliseconds (ms) in one embodiment, and generating the top ten completions within 16 ms in another testing). It should be noted, though, that use of the term "real-time" herein is not intended to be limiting and merely means displaying or otherwise providing one or more query completion suggestions to a user as, or relatively close to the time, a prefix or other portion of a query is being entered by the user into a search box or the like.

Mathematically, what is termed a "potential function" in the neural network is used to analyze string similarities and complete the queries in various embodiment of the present systems and methods. In a training or machine learning phase, the potential function examines logs for a particular search engine, reviewing what users have typed into the system and for what they've searched. The timeframe for such search logs is only limited by factors such as storage and processing power and could go back in time a matter of days or weeks, for example.

Analyzing the search logs with the goal of training to predict the next character(s) in any given query, the function attempts to derive a character-by-character language model suitable for the particular search engine. This is done as a particular search keyword or term may be popular on one search engine, but not another—for example, a search for an "iphone" (IPHONE is a registered trademark of Apple, Inc.) may be popular on a given online retailer or e-commerce website, but another type of phone or another device may be much more commonly used on another site's search engine. In other words, the learning or training of the various embodiments herein may be targeted to the content on a particular website, including what is entered into its search query box(es).

Other product and service search sites would be able to boost their performance by increasing coverage of their auto-complete systems. The use of the potential function that is currently being proposed for spelling correction could be enhanced to optimize for any number of business metrics, such as units purchased, and could permit display of products in the query completion suggestions 110. The present systems and methods can additionally faciliate generation of related keywords or searches, as well as close proximity searches and tailoring of search results to direct users to particular products or services. For example, if a potential online customer desires to purchase a particular brand of shoes, the e-commerce website being visited can embed the present functionality to propose other brands of shoes, in a refined query prior to the purchase or perhaps as a sidebar advertisement. Also, the present systems and method could be used to formalize or "clean up" a query (for example, removing or adding a space character) prior to its processing by the receiver, without a need for providing completion suggestions to the query submitter.

When a user types any prefix string s in a search engine, various embodiments of the query completion function herein will commence recommending the best r completions 110, each denoted ŝs, according to certain metrics. For example, one might want to maximize the probability that a recommendation is clicked. The conditional probability can be formulated as set forth below, and the goal of query completion in the setting is to find the top r most probable string ŝ which potentially also maximizes some additional metric, such as the click-through rate.

$$P(\hat{s}|s)(\text{completion prefix})$$

First addressing query completion in a simplified setting, in which all completion suggestions 110 must contain the prefix exactly and $s_{0:m}$ is denoted as the first m characters in string s and s0 as the empty set, that is: $\hat{s}_{0:m}=s_{0:m}$, and the following, where n is the total length of a completion.

$$P(\hat{s}_{0:n}|s_{0:m})=P(\hat{s}_{m+1:n}|s_{0:m})=P(\hat{s}_{m+1:n}|\hat{s}_{0:m})$$

Note that the probability is defined in the sequence domain, which contains exponentially many candidate strings. To simplify the model, the conditional probability formula recursively may be applied as per that below.

$$P(\hat{s}_{m+1:n}|\hat{s}_{0:m})\prod_{t=m}^{n}P(\hat{s}_{t+1}|\hat{s}_{0:t})$$

This way, only model $P(\hat{s}_{t+1}|\hat{s}_{0:t})$ needs to be modeled; that is, the probability of the next character under the current prefix. This is a character-level language model, and it can be machine-learned in an unsupervised manner using a variety of methods, including the use of recurrent neural networks (RNNs) for the character-level language model. Character-level models are the proper fidelity for search completion, because word-level models or sequence-to-sequence probabilities would not be able to model probabilities under all partial strings.

Now the focus turns on the language model term $P(\hat{s}_{t+1}|\hat{s}_{0:t})$, the probability of next character under a current prefix. RNNs in general, and variants like LSTMs, are extremely popular for high-fidelity character level-modeling and achieve state of the art performance for a number of data sets. Because they can be trained from unsupervised data (e.g., just data sets of many unannotated search queries), the model can be easily adapted to whatever terms users are actually searching for in the data set, with the potential to adapt to new searches, products, and the like merely by occasionally retraining the model on all data collected up to the current point.

Highlighting character-level language modeling, an example embodiment considers a recurrent neural network with hidden state $h_t$ at time t, with a desire to encode the prefix $\hat{s}_{0:t}$ and predict the next character using $h_t$, while using an LSTM model defined by the following recurrences:

$$i_t = \sigma(W_{xi}x_t + W_{hi}h_{t-1} + b_i)$$

$$f_t = \sigma(W_{xf}x_t + W_{hf}h_{t-1} + b_f)$$

$$o_t = \sigma(W_{xo}x_t + W_{ho}h_{t-1} + b_o)$$

$$c_t = i_t \odot \tan h(W_{xc}x_t + W_{hc}h_{t-1} + b_c) + f_t \odot c_{t-1}$$

$$h_t = o_t \odot \tan h(c_t).$$

In this embodiment, a "one hot" encoding (categorical variables converted for algorithmic use) of characters is used as input, a two-layer LSTM with 256 hidden units, and for prediction of character $\hat{s}_{t+1}$, the hidden layer $h_t$ is fed to a softmax function such as that below.

$$P(\hat{s}_{t+1}=i|\hat{s}_{0:t})=\text{softmax}(i;W_{softmax}h_t)=\frac{\exp(w_i^T h_i)}{\sum_{j=1}^{|C|}\exp(w_j^T h_i)},$$

$$\forall i \in \text{Character set } C$$

The model language model is trained to maximize the log likelihood (minimizing the categorical cross-entropy loss), where S denotes the set of queries. Further, all queries are padded with an end-of-sequence symbol to predict whether the query is complete.

$$\underset{w}{\text{minimize}} - \sum_{s \in S}\sum_{t=1}^{|s|}\log P(s_{t+1}|s_{0:t})$$

Given the language model, it is possible to evaluate the probability $P(\hat{s}_{m+1:n}|\hat{s}_{0:m})$ on any completion $\hat{s}_{0:m}$, but it is preferable to find the query completion suggestion 110 with highest probability. Enumerating all possible strings is not an option because there are exponentially many candidates. Indeed, finding the best sequence probability, which is called the "decoding problem," is NP-hard, so one must rely on approximation. The simplest way to do so is simply via stochastic sampling: sample the next character given the current prefix, until an end-of-sequence symbol is hit:

For t=m; ;t++:

$$\hat{s}_{t+1} \sim P(\hat{s}_{t+1}|\hat{s}_{0:t});$$

If $\hat{s}_{t+1}$==End-of-Seq:break;

This method produces output that appears intuitively reasonable. However, it is biased toward longer sequences with short-term dependencies and clearly does not generate the most probable sequences, because sampling in a one character at a time is not the same as sampling from the entire sequence space. In short, an approximate search is required to get better results. One way, known in the art, to do this is to perform a beam search instead of sampling character-by-character; that is, perform the breadth-first search while keeping the top-r candidates. An illustrative algorithm follows.

cand:={$s_{0:m}$: 0}, result:={ }
For t=m; cand is not empty; t++:
   cand$_{new}$:={$s_{0:t+1}$: log $P(s_{0:t+1}|s_{0:m})$, for every $s_{0:t} \in$ cand};
   cand:=the most probable r−|result| candidates in cand$_{new}$;
   Move $s_{0:t+1}$ from cand to result if $s_{t+1}$ is end-of-sequence symbol:

By applying the beam search algorithm, it is possible to consistently obtain a more probable set of completion suggestions 110 compared to the stochastic search and sampling. However, there are problems with this method as well, as it was previously used. First, it does not handle error correction (which is necessary for any practical type of completion), since the completion always attempts to find sequences that fit the current prefix 120 exactly. Second, a naive implementation of this model is extremely slow, often taking on the order of one second to produce 16 completions for a given prefix.

Query completion involves more than completing an input prefix 120. The input prefix 120 might very well contain mistakes, such as a missing or extra character, and sometimes it is desirable to insert keywords in the prefix 120. With a language-model-based approach, it is possible to both correct spelling and perform the insertion in one model.

Various embodiments integrate error correction into the language model completion via an edit-distance potential function and a variant of beam search that can exploit these potential functions.

Again, writing the problem on estimating query completion probability is done as below.

$$P(\hat{s}_{1:n}|s_{1:m})$$

Suppose that the query prefix 120 is no longer constrained to be exactly $\hat{s}_{1:m} = s_{1:m}$. To utilize the language model in some embodiments, the conditional distribution is augmented by adding an additional probability term $P(\hat{s}_{1:m}|s_{1:m})$, the probability of a prefix in the completion given an observed prefix 120; note that these need not be the same length, as one may want to insert or delete characters from the prefix 120. The completion probability now becomes:

$$P(\hat{s}_{1:n} | s_{1:m}) = P(\hat{s}_{m'+1:n} | \hat{s}_{1:m'}, s_{1:m}) P(\hat{s}_{1:m'} | s_{1:m})$$
$$= P(\hat{s}_{m'+1:n} | \hat{s}_{1:m'}) P(\hat{s}_{1:m'} | s_{1:m}),$$

where the last equality comes as it is assumed that the completion only depends on its prefix 120. The probability $P(\hat{s}_{1:m}|s_{1:m})$ models the error rate between the old and new prefix, meaning the probability of such modification/error over the old prefix 120.

An edit-distance algorithm corrects errors in various embodiments, edit distance being a way of quantifying how dissimilar two strings (e.g., words or portions thereof) are to one another by counting the minimum number of operations required to transform one string into the other. The Levenshtein distance, a string metric for measuring the difference between two sequences, may be applied in this setting, as the minimum number of single-character edits (insertions, deletions, or substitutions) required to change one word into another. For example, to automatically correct the word "cat" to the user-intended "bat," one of the three characters is the word "cat" must be fixed. The one character of the three total characters (33%) is the edit distance. In various embodiments, the edit-distance function can be used for measuring the distance between two strings. This function measures the minimum changes (add/remove/replace) to transform one string into another. If, say, $\hat{s}_{0:m0}$ is the correct prefix, the editing distance between $\hat{s}_{0:m0}$ and $s_{0:m}$ can be interpreted as the number of errors in the original prefix 120. Assuming that the probability users make an error is constant, the probability of a spelling error can be modeled as per below.

$$\log P(\hat{s}_{0:m}|s_{0:m}) = -\alpha \cdot \text{editing distance}(\hat{s}_{0:m}, s_{0:m})$$

Taking a 2% error rate gives $\alpha = -\log(1/50) \approx 4$. As is known in the art, the editing distance can be calculated using the following dynamic programming, although modifications may be made for the search completion setting.

$$\text{dist}_{edit} := [0, 1, \ldots, m];$$

For $i = 0; i \leq m'; i++:$

For $j = 0; j \leq m; j++:$

If $\hat{s}_i == s_j:$ $\text{dist}_{new}(j) := \text{dist}_{edit}(j-1);$

Else:

$$\text{dist}_{new}(j) = \min \begin{cases} \text{dist}_{new}(j-1) + 1 & \text{add} \\ \text{dist}_{edit}(j-1) + 1 & \text{substitution}; \\ \text{dist}_{edit}(j) + 1 & \text{delete} \end{cases}$$

$\text{dist}_{edit} := \text{dist}_{new};$

Output $\text{dist}_{edit}(m);$

The above algorithm takes O(m–m) time to run, and the distance should be evaluated for every new candidate in the beam search. Thus, if run naively, it makes an additional O(|C|rm–m') overhead to the beam search procedure, in which C denotes the possible character set. However, every new candidate is extended from old candidates—that is, only one character is changed in the outer loop of the editing distance algorithm if $\text{dist}_{edit}$ is maintained for all candidates. Such tracking will amortize the editing distance algorithm over the search, resulting in a much lower O(|C|rm) complexity.

Notably, the presently-disclosed technology can alo be configured to take phonetics, or word and letter sounds, into consideration. For example, if a search engine user inadvertently were to type "zuckini" instead of "zuchini," the algorithm can automatically make the correction based on the similarity of the sound of the entered text to the actual word. Further contemplated with respect to suggested search completions in some embodiments are things such as cultural sensitivities, age or other appropriateness, and markting considerations. Certain entered query prefixes 120 may also always be set to yield a designated (and perhaps the top) completion suggestion 110, and certain completion suggestions 110 may employ a word spelling set by region or that is consistent globally.

In handling insertion completion, to avoid a "penalty" for adding words after the last character of any term, a new distance function, called the "completion distance," may be used.

This function changes the above update rule to be:

$$\text{dist}_{new}(j) = \min \begin{cases} \text{dist}_{new}(j-1) + \mathcal{I}(s_{j-1} \neq \text{last char}) & \text{add} \\ \text{dist}_{compl}(j-1) + 1 & \text{substitution}; \\ \text{dist}_{compl}(j) + 1 & \text{delete} \end{cases}$$

By doing so, completing "poke go" as "pokemon go" would not incur unnecessary penalties (POKEMON GO is a trademark of Nintendo of America, Inc.).

It should be appreciated that the idea of inserting a potential function between different prefixes generalizes to contexts other than edit distance. For example, many product search engines wish to drive the user not simply to a high-probability query completion 110, but to a completion 110 that is likely to lead to an actual sale. By modifying the prefix probability to more heavily weight high-value completions, the present systems and methods can effectively optimize metrics other than simple completion probability. Moreover, as used herein, it should be noted that the term "edit distance potential function" includes, but is not limited to, lexical edit distances or phonetic edit distances known in the art, such as the soundex phonetic (indexing strings based on pronunciation) and double metaphone (converting words to encoded representations) algorithmic approaches to fuzzy matching.

As noted, a challenge for search query completion is performing the completions 110 in real-time. The response time is crucial for query completion because, unless the user can see completions 110 as he or she types a query, the results will likely have very little value. In one illustrative deployment, a target is to provide 16 completions in 20 ms. Unfortunately, a naive implementation of beam search using off-the-shelf implementations requires more than one second to complete forward propagation through the network and the beam search. Automated completions 110 are performed in real-time by the present systems and methods, using the neural network model. This requires a much smaller memory footprint than is required using the table lookup and memory approach and leads to much larger correction coverage. The disclosure following empirically improves performance by a factor of over 50×, to achieve sub-20 ms completion times.

Figure 4:
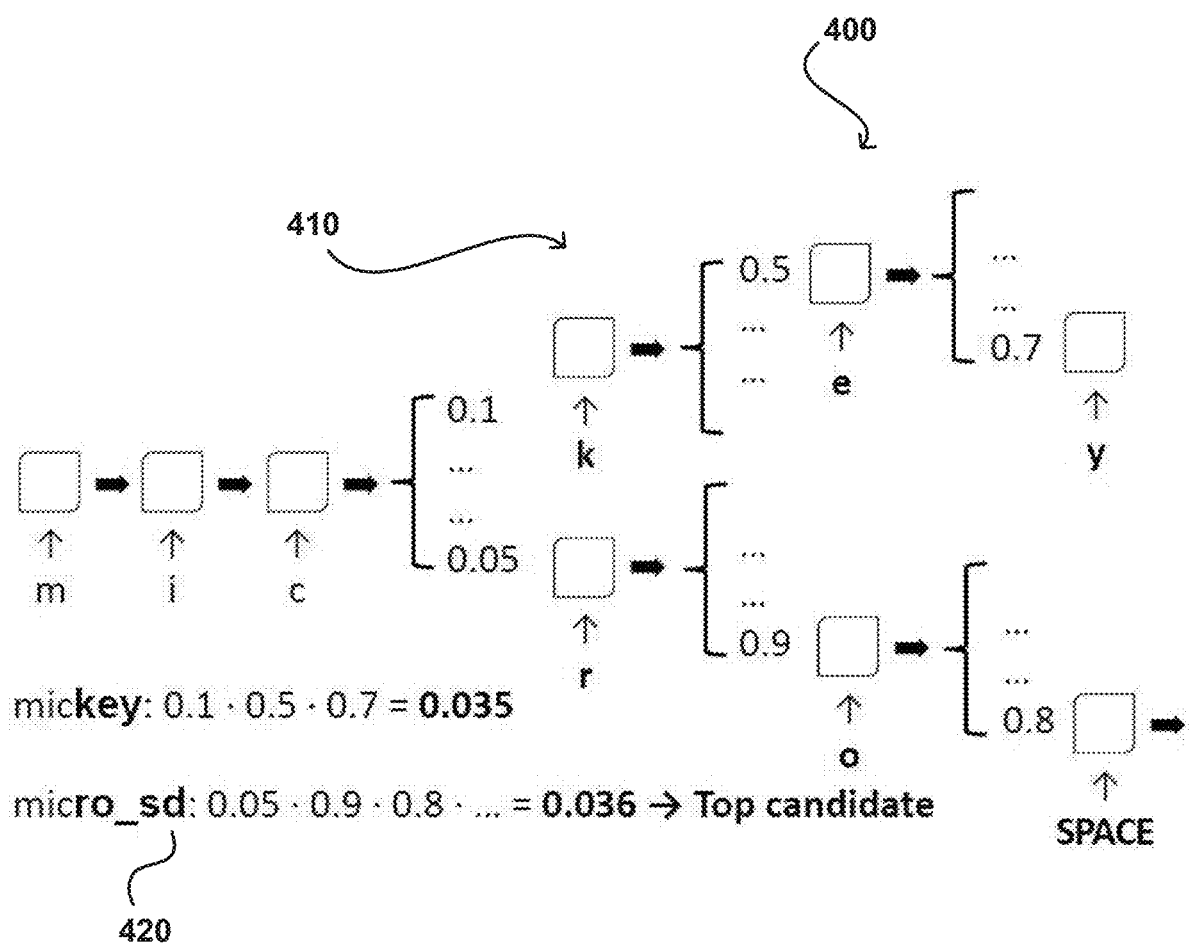
FIG. 4 illustrates a representative probability tree generated by a beam search algorithm in accordance with various embodiments.

In the interest of real-time correction and completion performance, an efficient tree-based version of the error-correcting beam search may be used, exploiting CPU-based computation for single queries (due to the high levels of branching in the beam search), and through numerous optimizations to the implementation discussed herein. The beam search does not make an immediate completion decision and keeps a finite set or subset ("a live set" with a "width" of so-many possibilities kept) of query completion suggestions 110 and continues looking for better completions moving along the sequence, as opposed to a pure stochastic focus on, and immediate selection of, the most likely next character, one at a time. FIG. 4 depicts a representative prefix tree 400 branching into various completion probabilities 410, including an eventually-calculated top candidate 420, where the characters "mic" commence the query, be it one entered by a user or occurring as part of a data set for testing. It should be appreciated that, for the automatic completion function, the real-time performance can be enhanced through the additional, or alternative, use of pre-gemerated queries through databases and tables.

All new candidates in the beam search process are extensions from the old candidates because of the breadth-first search (BFS) property. In this case, the forward propagations would greatly overlap. If $h_t$ is maintained for every old candidate, extending one character for new candidates would require only one forward propagation step. That is, the LSTM forward propagation is amortized over the search prefix tree 400. A representative algorithm for doing so is illustrated below.

```
cand := {s_{0:m} : (h_m, 0)}, result := { }:                                    O(md²)
For t = m; cand is not empty; t++:
    cand_new := { s_{0:t+1} : (h_t, log P (s_{0:t} | s_{0:m}) + log P (s_{t+1} | s_{0:t}))
        for every s_{t+1} ∈ C, for every s_{0:t} ∈ cand };                      O(r|C|d)
    cand := the most probable r − |result| candidates in cand_new;              (O(r|C|))
    Move s_{0:t+1} from cand to result if s_{t+1} is end-of-sequence            O(r)
    symbol;
    Bump h_t to h_{t+1} by one step of LSTM on s_{t+1}, ∀s_{0:t+1} ∈ cand;      O(rd²)
```

Using this approach, for example, the complexity for computing r completions for d-dimensional LSTM reduces from $O(n^2rd(d+|C|))$ to $O(nrd(d+|C|))$ for a sequence with maximum length n. A naive C implementation shows that the running time for such a search drops from over 1 sec to 250 ms.

In the interest of delivering targeted, or at least more on-point suggestions 110, in some embodiments, the prefix tree 400 and/or probability calculations herein, as well as user categorical input 140, can be applied to predict and suggest specific categories, subcategories, classes, subclasses, types, and the like 150 for the query completion suggestions 110.

Although graphics processing units (GPUs) are effective for many deep learning applications, and the present systems and methods can be used with GPU-based systems, for this particular application a CPU may be better suited to the task. This is due to the need for branching and maintaining relatively complex data structures in the beam search process, plus the integration of the edit distance computation. Implementation on a GPU requires a process that frequently shuffles very small amounts of data (each new character) between the CPU and GPU. Thus the entire beam search and forward inference in C can be implemented on the CPU.

With a pure CPU implementation, initially about 90% of the time is spent on computing the matrix-vector product in the LS™. It is possible to speed up the process by moving to batch matrix-matrix operations with a minibatch that consists for all r candidates maintained by beam search; by grouping together the product between the $W_s$ and $h_t$ for all r candidates maintained by the beam search procedure, this moves to a matrix-matrix product that even on the CPU has significantly better cache efficiency. In one illustrative implementation using the Intel® Math Kernel Library (MKL) BLAS routine, the total of these optimizations further reduced the running time to 75 ms. Further implementation parallelizing the updates via 8 OpenMP threads brings this time down to 25 ms.

A subtle speedup was attained was via a slightly-tweaked LSTM implementation. With the optimizations above, computing the sigmoid terms in the LSTM required a large 30% of the total computation time. This is due to the fact that: (i) the LSTM implementation uses a hard sigmoid activation, which as a clipping operation requires branch prediction; and (ii) the fact that the activations needed to apply the sigmoid are not consecutive in the hidden state vector means fast vectorized operations cannot be performed. By simply grouping together the terms $i_t$, $f_t$, $o_f$ in the hidden state, and by using SSE-based operations for the hard sigmoid, the time is further trained down to 13.3 ms, or 16.3 ms if the error correction procedure is included.

Experiments show that the presently-disclosed methods and systems substantially increase hit rate over standard approaches and are capable of handling tail queries. With a goal of using the character-level language model for query completion, the present methods were evaluated on the AOL search data set, comprising real-world searches from 2006. The data set contains 36,389,362 total search queries, with approximately 10 M of these being unique, illustrating the long tail in these search domains. A maximum sequence length for the queries was set at 60 characters, encompassing 99.5% of all queries.

For each example in the data set, a random cutting point (always after two characters in the string) was chosen, and all text beforehand was treated as the prefix 120 and all text afterwards as the completion 110. For examples in the test set, these prefixes and actual completions were used to evaluate the completions that the presently-disclosed methods predict. In the training set, the cutting points were discarded, with training just occurring on the characters themselves. A test set size of approximately 330K queries was used, with the rest for training. Training and testing splits were creatd for evaluation using two different strategies:

Prefix splitting: sorting the queries according to the md5 of the prefix then splitting, ensuring that data in the testing set does not contain an exact prefix match in the training set; and Time splitting: sorting the queries by timestamp and split, to mimic making predictions onlne as new data comes in.

The present character-level language model was trained on the characters of all of these queries, with, as noted, 330 k queries held out for testing. The LSTM language model was trained for three epochs over the entire data set, which took 7.2 hours on a GeForce® GTX 1080 Ti GPU. Employed was an LSTM with 256 hidden dimensions, two layers, and a dropbox of 0.5 between the two LSTM layers (no dropout within a single layer), as well as training with a step size of 1e-3 and minibatch size of 256.

In general, the present method substantially outperforms highly-optimized standard search completion algorithms in terms of its hit rate (the benefit of the deep language model and the error correction), while being fast enough to execute in real time for search engines. Training and validation losses for the language model, under the two different splitting are shown in Table 1.

TABLE 1

Character-level language model performance
for the LSTM on search query data set

| Train/test split | Train toss | Validation loss |
|---|---|---|
| Prefix splitting | 1.5454 | 1.4342 |
| Time splitting | 1.5566 | 1.4254 |

As far as runtime evaluation, speedups achieved by the different optimizations are shown in Table 2, which reports the time to give 16 suggestions for a query prefix 120. The stochastic search in this setting took three times longer than a beam search (to generate the same number of candidates). This is due to the fact that stochastic search tends to generate completions that are much longer than those of beam search, making the "simpler" method substantially slower in practice, in addition to yielding worse query completions.

TABLE 2

Increased execution speed via different optimizations

| Optimization | Resulting runtime |
|---|---|
| Naive beam search implementation | >1 sec |
| Tree-based beam search | 250 ms |
| Adding MKL BLAS | 75 ms |
| OpenMP parallelization | 25 ms |
| Custom LSTM implementation | 13.3 ms |
| Adding prefix edit distnace | 1.63 ms |
| Stochastic search | 40 ms |

The performances of the completion approaches were evaluated, both comparing the performance of the present beam search method to stochastic search (evaluated by log likelihood under the model), and comparing the present completion method to a heavily-optimized, in-memory, trie-base completion model, the standard data structure for searching given string prefixes.

Table 3 below presents the performance of beam search versus stochastic search for the query completion, evaluated in terms of log likelihood under the model. The results confirm the fact that beam search produces substantially better results under the model likelihood (in addition to being 3× faster). Note that, in this case, error correction is not included, as it is not trivial to integrate such into the stochastic search setting, and a direct comparison on sample likelihood was desired.

TABLE 3

Completion negative log likelihood for
stochastic vs. beam search (lower being better)

| Train/test split | Beam search | Stochastic Search |
|---|---|---|
| Prefix splitting | 2.537 | 3.284 |
| Time splitting | 2.703 | 3.605 |

Finally, the overall approach herein (beam search with error correction) was compared to a trie-based (i.e., prefix lookup) completion model, using a combination of two metrics: (i) probabilistic coverage, which is simply the empirical conditional probability of the predicted completion given the prefix below, where AP is the emperical probablility for the whole AOL data set (counts); and (ii) hit rate, which simply lists the number of times a completion appears in the data set.

$$\sum_i \hat{P}(\text{completion } i \mid \text{prefix})$$

Because the error correction model adjusts the query prefix 120, it is not possible to compute probabilistic coverage exactly, but one can still obtain a sense of how likely the completions are based upon how often they occur. Table 4 shows the performance of the tie-based approach, beam search alone, and beam search with error correction under these metrics.

TABLE 4

Performance of present language model-based
methods versus trie-based prefix lookup

| Train/test spilt | Method | Probabilistic coverage | Hit rate |
|---|---|---|---|
| Prefix splitting | Trie-based | 27.5% | 1480 |
| | Beam search | 39.7% | 1575 |
| | Beam search w/ error correction | — | 3360 |
| Time splitting | Trie-based | 48.6% | 1273 |
| | Beam search | 31.6% | 1040 |
| | Beam search w/ error correction | — | 1429 |

The beam search models discusesd herein generally outperform trie-based approaches in all settings. The one exception is probabilistic coverage on the time-based training/testing split, which is likely due to some amount of shift over time in the search query terms. Although it is not possible to generate coverage numbers for the error-correction method, the hit rate suggests that it is indeed giving better completions than the alternative approaches.

In addition to the lacking performance numbers, there are at least a few other notable disadvantages with the trie-based lookup approach. The trie data structure is very memory intensive (requiring keeping prefixes for all relevant queries in memory) and takes a minimum of 16 GB of RAM for the entire AOL search data set; this contrasts to the present character-level deep language model approach, which fits in a mere 18 MB. And if a prefix 120 has not been seen before in the data set, the trie-based approach will offer no completions. Further, the trie-based approach is not ammenable to error correction in isolation, as suggested candidate corrections 110 need to be proposed prior to lookup in the database; the process of repeatedly generating these candidates and performing the lookups will work when there are at most two edits, whereas the present approach empirically easily handles completions of four or five edits.

Figure 5:
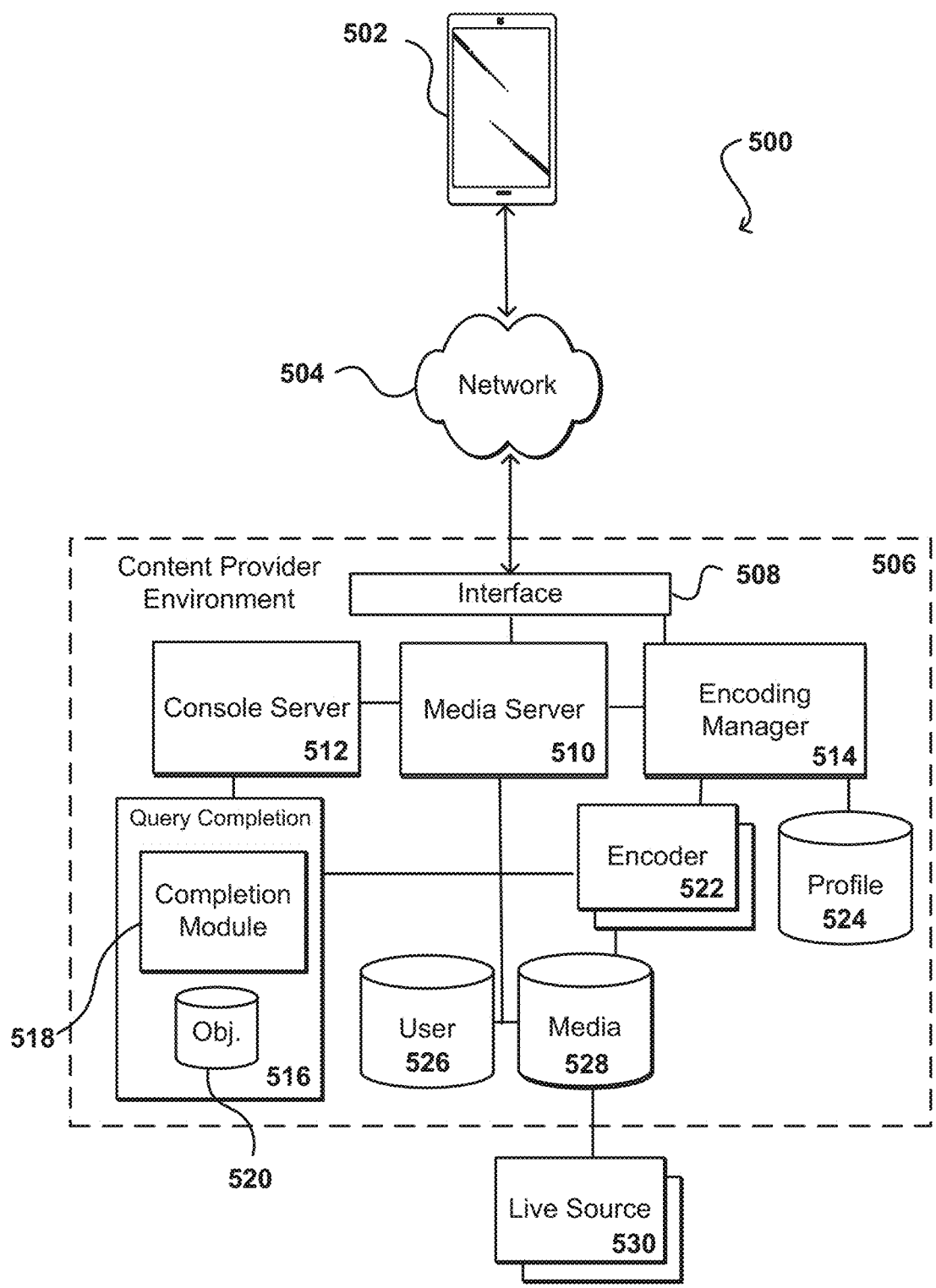
FIG. 5 illustrates an example searchable content delivery service that can be utilized in accordance with various embodiments.

FIG. 5 depicts an illustrative architecture 500 for a searchable content delivery service in which aspects of the various embodiments can be implemented. In this example, a client computing device 502 can submit a query 130 across at least one network 504 to be received by a content provider environment 506. The query 130 can include a request for specific content or a subscription to have content pushed to the client device 502, among other options. In at least some embodiments, the query 130 can include a request for content to be displayed on, or presented via, the computing device 502, and may include video, audio, or other media content that is encoded for presentation by the client device 502. The network(s) 504 can include any appropriate network, such as the internet, a local area network (LAN), a cellular network, an Ethernet, or other such wired and/or wireless network. The content provider environment 506 can include any appropriate resources for receiving queries and providing content from a resource provider, as may include various servers, data stores, and other such components known or used for providing content from across a network (or from "the cloud"). The client computing device 502 can be any appropriate computing or processing device, as may include a desktop or notebook computer, smartphone, tablet, wearable computer (i.e., a smart watch, glasses, or contacts), set top box, or other such system or device. An interface layer 508, when receiving a query 130 or other request or call, can determine the type of query, call, or request and cause information to be forwarded to the appropriate component or sub-system. For example, a query 130 or similar request for content might be forwarded to a media server 510 while a request to generate an encoding profile might be forwarded to an encoding manager 514 or a console server 512, among other such options. These calls or requests can also come from third parties, such as streaming content providers who utilize the resources of the content provider environment 506, and third party providers can provide at least some of the content to be stored to a media repository 528 and/or encoded for display on the client device 502. Further, a different type of client device 502 can be used to providing encoding information than is used to consume encoded content.

In this example, a query, call, or request received to the content provider environment 506 can be received by an interface layer 508 of the environment. As is known for network environments, the interface layer can include components such as search engine boxes and other interfaces (e.g., APIs), load balancers, request and/or data routers, and the like. If the query or other request is a request for content such as for a video data stream to be provided to the client device 502, information for the request can be directed to one or more media servers 510, which can obtain the content from a media data store 528 or other such repository or live media source 530 (or data cache temporarily storing media from the live media source) to be sent back across the network(s) 504 to the client device 502, which can be the device submitting the request or a device identified by the request, among other such options. In some embodiments, information for the request might also be compared against user data in a user data store 526 or other such location to determine, for example, whether the user has access rights to that content, and potentially the formats or versions to which the user has access rights. In at least some embodiments a request from an operator, an administrator, a client device 502, a third party provider, or another such source might include a request to specify one or more sets of encoding parameters to be used with a media file. Accordingly, information regarding the encoding parameters can be provided to an encoding manager 514, or other such component or service, that is able to receive the information through an appropriate interface (i.e., an API or console) and cause the profile and parameter data to be stored to at least one appropriate repository 524 as discussed elsewhere herein. When a query or request for a video file is received, the encoding manager 514 can use the profile and parameter data to determine the appropriate encoding information, and can pass that to one or more encoders 522, such as may include encoding applications running on one or more allocated servers (physical or virtual), which can obtain the media file and encode the media file per the encoding information, which can then be provided to the client device by a media server 510 or other such component.

As mentioned, it may be desired to perform search engine query completions 110 received by the content provider environment 506. A component such as the console server 512 can cause a query to be analyzed, and a query completion service 516 can analyze a query using one or more completion modules 518, and may include completion algorithms or trained neural networks, among other such options, and can compare the data in some embodiments against representations of object stored to an object data store 520. Confidence and/or probability scores can be generated for each determination in some embodiments, and, as noted, queries can be analyzed in some embodiments to improve the scores, including during a training or machine learning phase. Resulting object data, such as timestamps, can then be written to the encoder 522 for encoding in a log file, or stored to a media data store 528, among other options.

Storage media and other non-transitory computer readable media for containing query completion content or code can include any appropriate media known or used in the art, including storage media and communication media, such as, but not limited to, volatile and non-volatile, removable, and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device.

It should be understood that there can be several application servers, layers, or other elements, processes, or components, which may be chained or otherwise configured, which can interact to perform tasks such as obtaining query and query completion data from an appropriate data set, database, or data store. As used herein the term "data set," "database," or "data store" refers to any device or combination of devices capable of storing, accessing, and retrieving data, which may include any combination and number of data servers, databases, data stores, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to a querying user, which may be served to the user by the Web server in the form of HTML, Extensible Markup Language (XML), or another appropriate structured language in this example. The handling of all requests and responses, as well as the delivery of content between the client device 502 and the application server, can be handled by the Web server. Content relating to a particular suggested item of user interest can be viewed in a dedicated page or window of the user's browser. And a search engine or other query opportunity can narrow the range of possible suggestion completions 110 by including functionality allowing categorization, such as a drop-down option in a search box permitting the querying user to specify a particular type of product or service being sought. It should be understood, though, that the Web and application servers are not required and are merely example components, as structured code discussed herein can be executed on any appropriate device or host machine as discussed elsewhere herein.

The data set can include several separate data tables, databases, or other data storage mechanisms and media for storing data relating to a particular aspect. For example, the data store can include mechanisms for storing query completion content, training data for purposes of developing a character-level language model, and test results. The data store is operable, through logic associated therewith, to receive instructions from a server and obtain, update or otherwise process data in response thereto.

Figure 6:
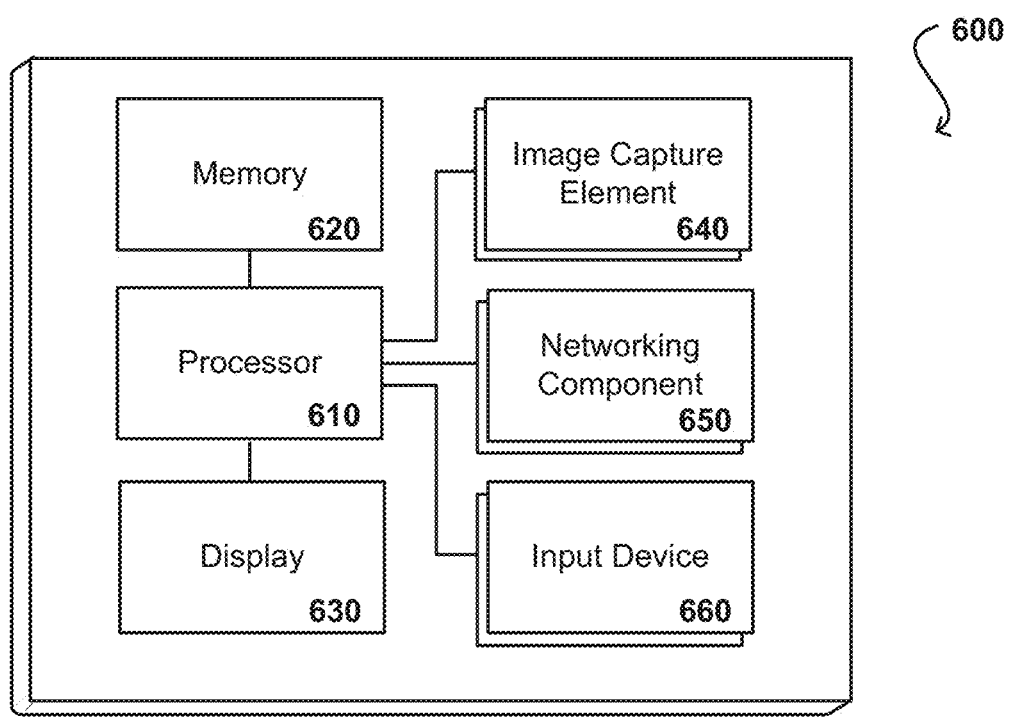
FIG. 6 illustrates components of an example computing device that can be used in accordance with various embodiments.

FIG. 6 illustrates a set of basic components of a device 600 that can be used to implement aspects of the various embodiments, including receiving search engine queries 130 and displaying query completion suggestions 110 on a client device 502 on a network 504. In this example, the device 600 includes at least one processor 610 for executing instructions that can be stored in a memory device or element 620. As would be apparent to one of ordinary skill in the art, the device can include many types of memory 620, data storage, or computer-readable media, such as a first data storage for program instructions for execution by the at least one processor 610 (which, again, can be, or include, a GPU or CPU in some embodiments), the same or separate storage can be used for images or data, a removable memory 620 can be available for sharing information with other devices, and any number of communication approaches can be available for sharing with other devices. The device typically will include at least one type of display element 630, such as a touch screen, electronic ink (e-ink), organic light emitting diode (OLED), or liquid crystal display (LCD), although devices such as portable media players might convey information via other means, such as through audio speakers.

The device 600 in some embodiments will include at least one video or image capture element 640, such as at least one video or image capture element 640 positioned to determine a relative position of a viewer and at least one video or image capture element 640 operable to image a user, people, or other viewable objects in the vicinity of the device 600. A video or image capture element 640 can include any appropriate technology, such as a charge-coupled device (CCD) video or image capture element 640 having a sufficient resolution, focal range, and viewable area, to capture video or an image when the user is operating the device 600. Methods for capturing images or video using an image capture element with a computing device are well known in the art and will not be discussed herein in detail. It should be understood that video or image capture can be performed using a single image, multiple images, periodic imaging, continuous image capturing, image streaming, etc. The device 600 can include at least one networking component 650 as well, and, as noted, may include one or more components enabling communication across at least one network, such as the internet, a cellular network, an intranet, an extranet, a local area network, Wi-Fi, and the like. Accordingly, it is envisioned that query completion suggestions 110 may be delivered which relate in some way to images captured by the image capture element 640.

The device 600 can include at least one motion and/or orientation determining element, such as an accelerometer, digital compass, electronic gyroscope, or inertial sensor, which can assist in determining movement or other changes in orientation of the device. The device 600 can include at least one additional input device 660 able to receive conventional input from a user. This conventional input can include, for example, a push button, touch pad, touch screen, wheel, joystick, keyboard, mouse, trackball, keypad, or any other such device or element whereby a user can input a command to the device. These input/output (I/O) devices 660 could even be connected by a wireless infrared, Bluetooth, or other link as well in some embodiments. In some embodiments, however, such a device 600 might not include any buttons at all and might be controlled only through a combination of visual and audio commands such that a user can control the device without having to be in contact with the device. In one illustrative use case, a query prefix 120 and/or a search category 140 is input through an intelligent personal assistant such as the cloud-based voice service ALEXA™ from Amazon.com, Inc.

The various embodiments can be implemented in a wide variety of programming languages and operating environments, which in some cases can include one or more user computers, computing devices, or processing devices which can be used to operate any of a number of applications. The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in the accompanying figures. Further, one programming language may be utilized for the training phase, while another language may be used to develop the production system. Thus, the depiction of the systems and environments in the figures, as well as this written description, should be taken as being illustrative in nature and not limiting to the scope of the disclosure.

User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network 504 that would be familiar to those skilled in the art for supporting communications using any of a variety of commercially-available protocols, such as Transmission Control Protocol/ Internet Protocol (TCP/IP), Open System Interconnection (OSI), File Transfer Protocol (FTP), Universal Plug and Play (UpnP), Network File System (NFS), Common Internet File System (CIFS), and AppleTalk. The network 504 can be, for example, a local area network, a wide-area network, a virtual private network, the Internet, an intranet, an extranet, a public switched telephone network, an infrared network, a wireless network, and any combination thereof In embodiments utilizing a Web server, the Web server can run any of a variety of server or mid-tier applications, including Hypertext Transfer Protocol (HTTP) servers, File Transfer Protocol (FTP) servers, Common Gateway Interface (CGI) servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, or TCL, as well as combinations thereof. The server(s) may also include database servers, including without limitation those commercially available from Oracle®, Microsoft®, Sybase®, and IBM®.

Based on the disclosure and teachings provided herein, a person of ordinary skill in the art will appreciate other ways and/or methods to implement the various embodiments. The specification and drawings are, accordingly, to be regarded in an illustrative, rather than a restrictive, sense. It will be evident that various modifications and changes may be made thereunto without departing from the broader spirit and scope of the invention as set forth in the claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure. Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

What is claimed is:

1. A computer-implemented method, comprising:
   receiving, by a search engine, a query string including at least a portion of a search query to be executed by the search engine;
   generating one or more potential spelling corrections for the query string by applying an edit-distance potential function, the edit-distance potential function calculating errors in the query by measuring a minimum number of changes to transform a character string in the query into another string having corrected spelling;
   training a multi-layer recurrent neural network on a data set to develop a character-level language model, the data set including at least one of query logs, product or service information, or customer reviews;
   applying the multi-layer recurrent neural network to the query string and the spelling corrections to generate, based at least in part on the character-level language model, a plurality of suggestions for completing the portion of the search query, the character-level language model recursively operating on at least one character in a prefix in the query string;
   generating the suggestions through a prefix tree;
   selecting and ranking the suggestions by a heuristic beam search algorithm; and
   providing for display, as the query string is entered into the search engine, at least a subset of the suggestions as ranked.

2. The computer-implemented method of claim 1, further comprising:
   factoring in, by the edit-distance potential function, phonetics, sensitivity, relevance, or marketing considerations when generating the spelling corrections; and
   predicting, and providing for display, at least one category for the subset of suggestions.

3. The computer-implemented method of claim 1, further comprising:
   estimating, by the edit-distance potential function, one or more probabilities for completing the query; and
   generating the spelling corrections based on the one or more probabilities.

4. A computer-implemented method, comprising:
   receiving at least a portion of a query;
   processing one or more characters of the query using a dissimilarity analysis function to determine potential spelling corrections, the dissimilarity analysis including application of at least one edit-distance function calculating errors in the query by measuring a minimum number of changes to transform a character string in the query into another string having corrected spelling;
   training a neural network on a data set to develop a character-level language model, the data set including at least one of query logs, product or service information, or customer reviews;

applying the neural network to the query and the spelling corrections to generate, based at least in part on the character-level language model, a plurality of suggestions for completing the query, the character-level language model recursively operating on at least one character in a prefix in the query;

ranking the suggestions through a beam search algorithm; and providing for display, as the query is entered into the search engine, at least a subset of the suggestions as ranked.

5. The computer-implemented method of claim 4, wherein the neural network is a multi-layer, character-level, long short-term memory (LSTM) recurrent neural network.

6. The computer-implemented method of claim 5, further comprising:

applying the LSTM neural network over a tree generated by the beam search algorithm.

7. The computer-implemented method of claim 4, further comprising:

estimating, by the edit-distance function, one or more probabilities for completing the query;

generating the spelling corrections based on the one or more probabilities; and factoring in, by the edit-distance function, phonetics or marketing considerations when generating the spelling corrections.

8. The computer-implemented method of claim 7, further comprising:

predicting at least one category for the subset of suggestions;

providing for display the at least one category; and optimizing the subset of suggestions in accordance with business metrics.

9. The computer-implemented method of claim 4, further comprising:

displaying the spelling corrections when the query includes a spelling error.

10. The computer-implemented method of claim 4, further comprising:

padding the query as entered with an end-of-sequence symbol to assist in estimating when the query is complete.

11. A computing system, comprising:

at least one processor; and memory including instructions that, when executed by the at least one processor, cause the computing system to:

receive at least a portion of a query;

process one or more characters of the query using a dissimilarity analysis function to determine potential spelling corrections, the dissimilarity analysis including application of at least one edit-distance function calculating errors in the query by measuring a minimum number of changes to transform a character string in the query into another string having corrected spelling;

train a neural network on a data set to develop a character-level language model, the data set including at least one of query logs, product or service information, or customer reviews;

apply the neural network to the query and the spelling corrections to generate, based at least in part on the character-level language model, a plurality of suggestions for completing the query, the character-level language model recursively operating on at least one character in a prefix in the query;

rank the suggestions through a beam search algorithm; and provide for display, as the query is entered into the search engine, at least a subset of the suggestions as ranked.

12. The computing system of claim 11, wherein the neural network is a multi-layer, character-level, long short-term memory (LSTM) recurrent neural network.

13. The computing system of claim 12, wherein the instructions when executed further cause the computing system to:

apply the LSTM neural network over a tree generated by the beam search algorithm.

14. The computing system of claim 11, wherein the instructions when executed further cause the computing system to:

estimate, by the edit-distance function, one or more probabilities for completing the query;

generate the spelling corrections based on the one or more probabilities; and factor in, by the edit-distance function, phonetics or marketing considerations when generating the spelling corrections.

15. The computing system of claim 14, wherein the instructions when executed further cause the computing system to:

predict at least one category for the subset of suggestions;

provide for display the at least one category; and optimize the subset of suggestions in accordance with business metrics.

16. The computing system of claim 11, wherein the instructions when executed further cause the computing system to:

display the spelling corrections when the query includes a spelling error.

17. The computing system of claim 11, wherein the instructions when executed further cause the computing system to:

pad the query as entered with an end-of-sequence symbol to assist in estimating when the query is complete.

* * * * *